US008760801B2

(12) United States Patent
Das et al.

(10) Patent No.: US 8,760,801 B2
(45) Date of Patent: Jun. 24, 2014

(54) MAGNETIC HEAD HAVING A PLANAR HALL EFFECT READ SENSOR

(75) Inventors: Sarbanoo Das, Sagamihara (JP); Masafumi Mochizuki, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 586 days.

(21) Appl. No.: 12/976,975

(22) Filed: Dec. 22, 2010

(65) Prior Publication Data

US 2012/0162810 A1 Jun. 28, 2012

(51) Int. Cl.
*G11B 5/37* (2006.01)

(52) U.S. Cl.
USPC .......................................... 360/112; 360/110

(58) Field of Classification Search
USPC .................................................. 360/110, 112
See application file for complete search history.

(56) References Cited

U.S. PATENT DOCUMENTS

| 5,396,455 | A | * | 3/1995 | Brady et al. ..................... 365/97 |
| 6,910,382 | B2 | | 6/2005 | Tang et al. |
| 7,106,560 | B2 | | 9/2006 | Hasegawa et al. |
| 7,218,485 | B2 | | 5/2007 | Hasegawa et al. |
| 7,440,227 | B2 | | 10/2008 | Chattopadhyay et al. |
| 7,466,515 | B2 | | 12/2008 | Carey et al. |
| 7,576,948 | B2 | * | 8/2009 | Covington et al. ........... 360/112 |
| 2001/0040450 | A1 | | 11/2001 | Li et al. |
| 2002/0067581 | A1 | | 6/2002 | Hiramoto et al. |
| 2002/0071208 | A1 | | 6/2002 | Batra et al. |
| 2004/0012899 | A1 | | 1/2004 | Hasegawa et al. |
| 2005/0018345 | A1 | * | 1/2005 | Gerber .......................... 360/112 |
| 2010/0061014 | A1 | * | 3/2010 | Das et al. ...................... 360/112 |
| 2010/0142099 | A1 | | 6/2010 | Hong et al. |

OTHER PUBLICATIONS

Wood et el., "The Feasibility of Magnetic Recording at 10 Terabits Per Square Inch on Conventional Media," IEEE Transactions on Magnetics, vol. 45, No. 2, Feb. 2009, pp. 917-923.
"CMRR Report Center for Magnetic Recording Research," University of California, San Diego, No. 33, Winter 2010, pp. 1-16.
Wood at al., "Perpendicular Magnetic Recording Technology," 2007 Hitachi Global Storage Technologies, Nov. 2007, White Paper, pp. 1-4.

* cited by examiner

*Primary Examiner* — Wayne Young
*Assistant Examiner* — Carlos E Garcia
(74) *Attorney, Agent, or Firm* — Zilka-Kotab, PC

(57) ABSTRACT

In one embodiment a magnetic head includes a sensor thin film adapted for producing a planar Hall voltage, the sensor thin film having a thickness along a down-track direction that is greater than a thickness along a cross-track direction. The down-track direction is in a direction of travel of a magnetic medium relative to the sensor thin film, and the cross-track direction is perpendicular to the down-track direction. In another embodiment, at least one magnetic head as described above is included in a magnetic data storage system, which includes a magnetic medium, a drive mechanism for passing the magnetic medium over the at least one magnetic head, and a controller electrically coupled to the at least one magnetic head for controlling operation of the at least one magnetic head. Other heads and systems are described according to various other embodiments.

23 Claims, 15 Drawing Sheets

MAGNETIC HEAD HAVING A PLANAR HALL EFFECT READ SENSOR

FIELD OF THE INVENTION

The present invention relates to a magnetic recording and reading, and specifically relates to magnetic reproducing element using a planar Hall effect, a kind of galvanomagnetic effect, and uses thereof.

BACKGROUND OF THE INVENTION

The need in the field of magnetic data storage for increased data storage capacity in data storage devices, such as magnetic hard disk drives (HDDs), requires that the areal-density of these devices, defined by the data can be stored in a given area of magnetic disk, be increased. Due to its advantages in increasing areal-density over longitudinal recording systems, which use the in-plane orientation of magnetic moments, perpendicular magnetic recording systems, which employ the alignment of magnetic moments perpendicular to the disk surface, are already in production. For a HDD, areal-density is the product of bit-density (number of bits per unit length along the track-direction) and track-density (number of tracks per unit length along the radial direction). Areal-density can be increased either by increasing bit-density and/or track-density. In general, both the bit-density and track-density are increased to achieve higher areal-density.

Among the technologies that have so far contributed to increasing the areal-density of HDDs, the application of magneto-resistive sensors as read heads holds tremendous promise. A reproducing element used in many current HDDs employs a magneto-resistive effect, a phenomenon where electric resistance of the element changes due to a change in a magnetic orientation of the magnetic field emanating from a magnetic disk medium. In general, a giant magneto-resistance (GMR) or a tunnel magneto-resistance (TMR) element may be used in current HDDs.

Referring to FIG. 1, a GMR or a TMR element possesses a spin-valve structure, comprised of a "pinned layer" 42 with magnetic moment 42a aligned to a particular direction, and a "free layer" 43 with magnetic moment 43a adapted to rotate freely along the film plane. Rotation of the magnetic moments in the free layer due to the magnetic field 9a emanating from the magnetic disk medium 9 makes an angle $\theta$44 between the magnetic moments of the free layer and the pinned layer. This angular difference, which is detected through a change of electric resistance of the element, changes by the upward and downward magnetic flux from the medium enabling the detection of the magnetization orientation in the written bit on the magnetic medium. Change of electric resistance is measured in the form read-voltage, in most cases.

In order to increase the track-density of a magnetic medium, which is one method to achieve higher areal-density, the track-width 41 and track pitch defined by the distance between the two adjacent tracks may be decreased. An intensity of magnetic flux that emanates from a track in the medium becomes greatest at the track center, where the bits are well-written and not influenced by surrounding effects. As the distance from the track center increases, the magnetization pattern emanated from the track gets distorted this distortion becomes greatest (the pattern is the most distorted) at the track-edge region, where all of the magnetizations in the medium do not necessarily align perfectly along the upward or downward direction (e.g., there are magnetizations in a direction not perpendicular to the plane of the medium surface).

At the track center, read sensitivity of a read head becomes greatest while it runs along a cross-track direction. Read-voltage signals become smaller at the track-edge region due to the distortion of magnetization alignment. Moreover, total magnetic flux emanating from the medium for a track decreases with the decrease of track width, resulting in a decrease of the read-voltage, an effect experienced even at the track-center. While a narrow track is read by a sensor element with fixed width, it senses "unexpected" signals from the track-edge region resulting in a decrease of read-voltage even when the sensor is positioned at the track-center. Moreover, a reduction of track pitch brings two adjacent tracks closer to each other, which causes the problem of side reading even when a read sensor is positioned on an adjacent track.

A reduction of sensor-width 40 helps to overcome the problem of sensing the signals from the track-edge and adjacent tracks. However, a simple reduction of sensor-width results in another problem. In general, an initial magnetization state of the free layer of a sensor element is defined by applying a magnetic field from an adjacent layer, referred to as "hard bias." Influence of a hard bias field, which is applied along the cross-track width direction, is stronger at the two edges of the free layer 43 than at the region away from the edge (i.e., around the middle portion of the sensor). For a fixed value of a hard bias field, sensitivity (how freely the magnetization can rotate) of the free layer is reduced while sensor-width is narrowered, which is due to the increase of the region strongly influenced by the hard bias field. A simultaneous reduction of the hard bias magnetic field is helpful to keep the sensitivity of the sensor to a certain degree. However, excessive reduction of the hard bias field makes the free layer more sensitive to the magnetization in the neighboring track, which increases side reading.

A method to improve read element sensitivity while sensor-width is reduced is described in U.S. Pat. No. 7,106,560 and U.S. Patent Application Publication No. US2004/0012899. As described in these references, the bias magnetic field applied to the free layer varies along the sensor height—e.g., the bias magnetic field applied to a region away from the air bearing surface is smaller than that applied in a region close to the air bearing surface. However, for further decrease of sensor width, read head sensitivity in the region away from the air bearing surface might be reduced unless a bias magnetic field is changed, and in such a case, this attempt may not be able to keep the read head sensitivity to a satisfactory level. Further reduction of the bias magnetic field might help to keep the read head sensitivity, but this ultimately may not be sufficient for use with the extremely narrow sensor width.

In a conventional read sensor element, which possesses magnetic films with in-plane magnetic anisotropy, magnetizations are aligned along the cross-track direction (as illustrated in FIG. 1) partly with the help of shape anisotropy. While sensor-width is reduced, in-plane magnetization orientation becomes unstable and a circular magnetization mode is preferable to minimize the total magnetic energy of the element. Under such circumstances, sensitivity of the read head deteriorates drastically and becomes unable to cope with the extremely narrow track width.

In U.S. Pat. No. 6,910,382, a magnetic-semiconductor based sensor device is proposed that has a high-sensitivity sensor to detect magnetization switching behavior in magnetic recording devices. The proposed device employs the detection of voltage change due to a galvanomagnetic phenomenon referred to as a "planar Hall effect." Unlike metallic ferromagnetic materials, magnetic-semiconductor materials proposed in this reference exert performance in an extremely low (such as about 20K) temperature region. In addition, in realistic magnetic recording devices (such as HDDs), operation under normal room temperature (such as in a range of 293K-303K) is a necessary condition. Moreover, the change of voltage due to planar Hall effect described in this patent is basically non-linear in nature with respect to an external magnetic field. The method requires the total switching of the magnetization of the sensor part to detect the magnetization pattern written on a magnetic disk medium. On the other hand, in current HDDs, a linear part of the head sensitivity criteria (voltage or resistance change with respect to an external magnetic field) is used, and thus, instead of taking advantage of the total magnetization switching, rotation of magnetization (a phenomenon before the magnetization switches totally to the direction opposite to its initial orientation) of the sensor may be employed.

Therefore, a read sensor with high sensitivity that is capable of reproducing the data written on a narrow track of a magnetic medium would be beneficial to increase both track-density and areal-density of the magnetic medium.

SUMMARY OF THE INVENTION

In one embodiment a magnetic head includes a sensor thin film adapted for producing a planar Hall voltage, the sensor thin film having a thickness along a down-track direction that is greater than a thickness along a cross-track direction. The down-track direction is in a direction of travel of a magnetic medium relative to the sensor thin film, and the cross-track direction is perpendicular to the down-track direction.

In another embodiment, a magnetic data storage system includes at least one magnetic head, a magnetic medium, a drive mechanism for passing the magnetic medium over the at least one magnetic head, and a controller electrically coupled to the at least one magnetic head for controlling operation of the at least one magnetic head. The magnetic head includes a sensor thin film adapted for producing a planar Hall voltage, the sensor thin film having a thickness along a down-track direction that is greater than a thickness along a cross-track direction, and two voltage electrodes coupled to the sensor thin film, the voltage electrodes allowing detection of a change of the planar Hall voltage across the sensor thin film due to a change of an angle between current passing through the sensor thin film and a magnetization of the sensor thin film during operation of the sensor thin film. The planar Hall voltage detected by the voltage electrodes corresponds to a magnetization of recorded bits on a magnetic medium, a magnetization of the sensor thin film preferentially orients about parallel to the down-track direction under application of a bias magnetic field oriented about parallel to the down-track direction, wherein the magnetization of the sensor thin film rotates relative to the down-track direction in response to an external magnetic field oriented in a sensor thin film height direction, the down-track direction is in a direction of travel of a magnetic medium relative to the sensor thin film, and the cross-track direction is perpendicular to the down-track direction.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference may be made to the following detailed description read in conjunction with the accompanying drawings.

DETAILED DESCRIPTION

Figure 1:
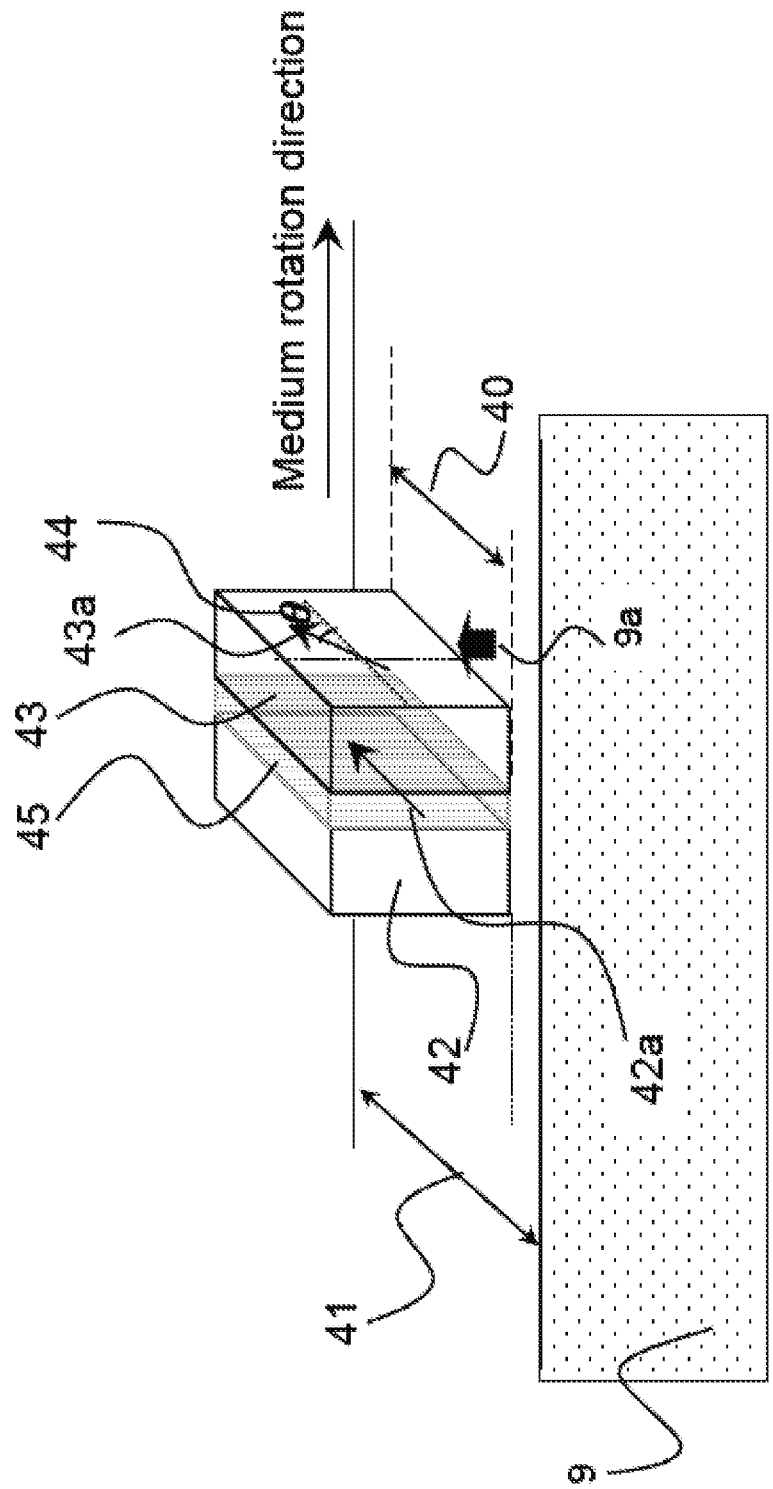
FIG. 1 is an schematic view showing a method of detecting magnetic field from the bits written on a magnetic medium using a read-element that uses conventional TMR or GMR sensor, according to prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment a magnetic head includes a sensor thin film adapted for producing a planar Hall voltage, the sensor thin film having a thickness along a down-track direction that is greater than a thickness along a cross-track direction. The down-track direction is in a direction of travel of a magnetic medium relative to the sensor thin film, and the cross-track direction is perpendicular to the down-track direction.

In another general embodiment, a magnetic data storage system includes at least one magnetic head, a magnetic medium, a drive mechanism for passing the magnetic medium over the at least one magnetic head, and a controller electrically coupled to the at least one magnetic head for controlling operation of the at least one magnetic head. The magnetic head includes a sensor thin film adapted for producing a planar Hall voltage, the sensor thin film having a thickness along a down-track direction that is greater than a thickness along a cross-track direction, and two voltage electrodes coupled to the sensor thin film, the voltage electrodes allowing detection of a change of the planar Hall voltage across the sensor thin film due to a change of an angle between current passing through the sensor thin film and a magnetization of the sensor thin film during operation of the sensor thin film. The planar Hall voltage detected by the voltage electrodes corresponds to a magnetization of recorded bits on a magnetic medium, a magnetization of the sensor thin film preferentially orients about parallel to the down-track direction under application of a bias magnetic field oriented about parallel to the down-track direction, wherein the magnetization of the sensor thin film rotates relative to the down-track direction in response to an external magnetic field oriented in a sensor thin film height direction, the down-track direction is in a direction of travel of a magnetic medium relative to the sensor thin film, and the cross-track direction is perpendicular to the down-track direction.

According to one embodiment, a read-head device includes a sensor thin film that may have a thickness along the down-track direction that is greater than a thickness along the cross-track direction. In a further embodiment, the thickness along the down-track direction may be at least twice that of the thickness along the cross-track direction.

According to another embodiment, in the presence of a bias magnetic field applied along the down-track direction, a sensor magnetization rotates preferentially along the down-track direction under the application of an external magnetic field emanating from recorded bits on a perpendicular magnetic recording disk medium.

In yet another embodiment, a change of a planar Hall voltage due to a change of an angle between current passed through a sensor and a magnetization of the sensor that is detected by two voltage electrodes enables detection of recorded bits on a magnetic disk medium. In another approach, the device may be operated with an angle between the current passed through the sensor film and the sensor magnetization ranging between about 45° to about 135°.

In one alternative approach, two hard bias magnetic films on opposite sides of a sensor along the down-track direction may be used as electrodes to detect planar Hall voltage generated in the sensor. In another approach, hard bias magnetic thin films on opposite sides of the sensor along the down-track direction may possess perpendicular magnetic anisotropy, while the sensor film itself possesses magnetic anisotropy along a plane defined by the down-track direction and a sensor height direction.

Additionally, an insulator (non-electroconductive material) thin film between the two current electrodes may be used to prevent direct current flow between the electrodes instead of current flowing through the sensor. In another approach, two magnetic shield thin films on opposite sides of the sensor along the down-track direction may be used to prevent reading data from neighboring bits on the magnetic medium.

Figure 2A:
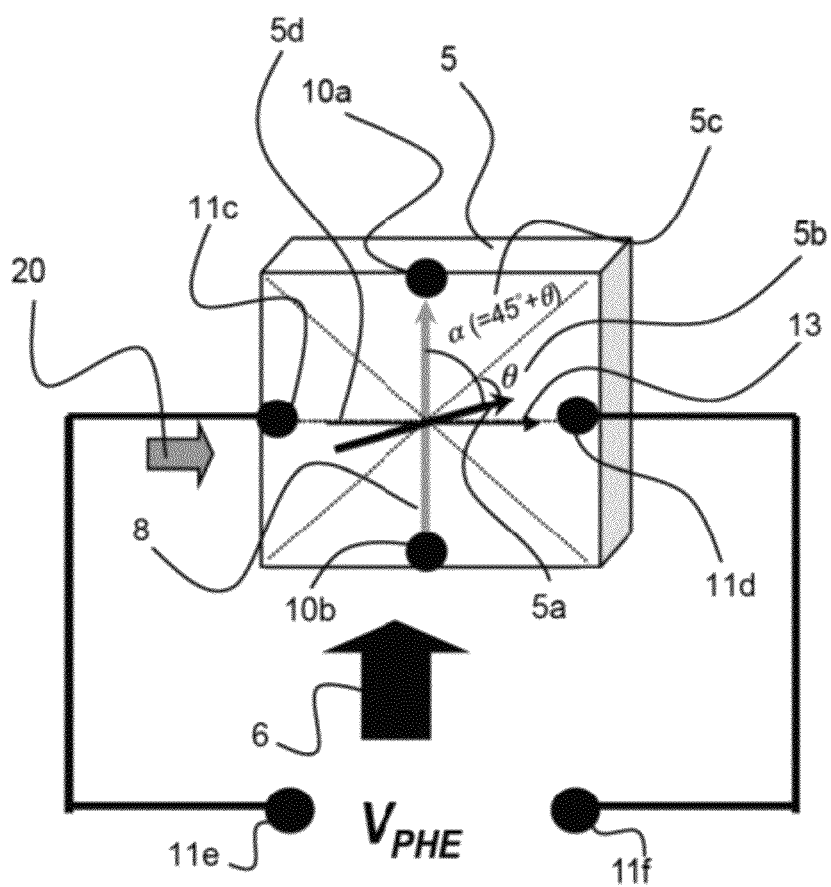
FIG. 2A shows a process of generation of planar Hall voltage from a sensor film with in-plane magnetization.
Figure 2B:
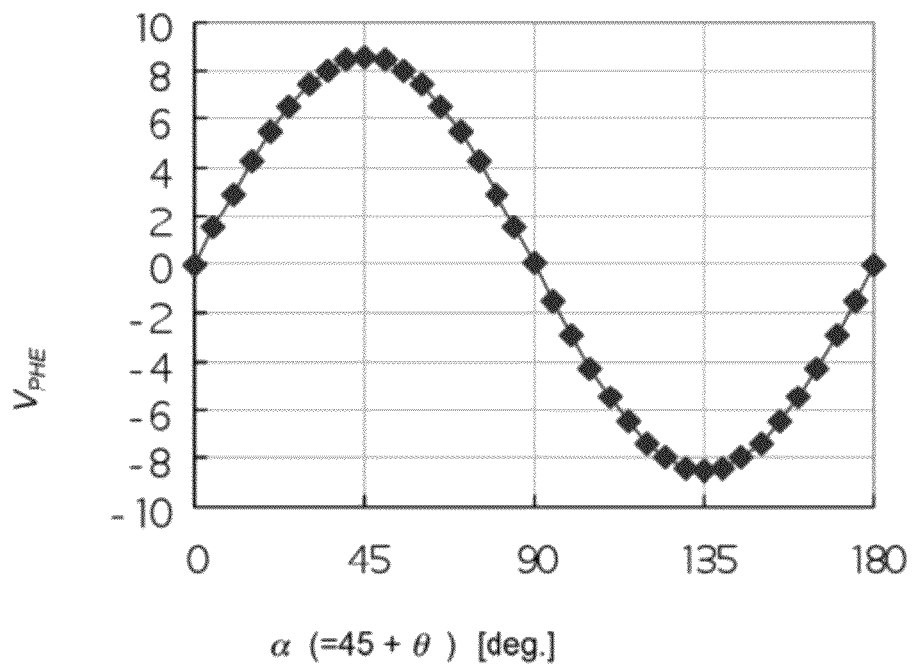
FIG. 2B shows the change of planar Hall voltage with respect to the angle between the current passed through the sensor film and the magnetization.

According to one embodiment, a device that employs the planar Hall effect, a galvanomagnetic phenomenon of a ferromagnetic thin film having magnetization aligned along the in-plane direction, may be used in a magnetic head. FIGS. 2A-2B show a detection method of a planar Hall voltage, $V_{PHE}$, generated due to the planar Hall effect of a ferromagnetic thin film 5 of a sensor, according to one embodiment. The Planar Hall effect has been described in literature and possesses similarity with what is known as a magneto-resistive effect. $V_{PHE}$ is generally defined by Equation 1, as follows:

$$V_{PHE}=R_{PHE}IM^2\sin(2\alpha)/t \qquad \text{Equation 1}$$

where $R_{PHE}$ is the planar Hall coefficient, I is the current passed through the ferromagnetic film, M is the spontaneous magnetization of the film, $\alpha$ is the angle between current I and spontaneous magnetization M, and t is the film thickness. As shown in FIG. 2A, a DC current 8 is passed through the film by applying a voltage between the current electrodes 10a and 10b. A Planar Hall voltage, $V_{PHE}$, due to the planar Hall effect is detected at the voltage terminal 11e and 11f through the voltage electrodes 11c and 11d. In the absence of an external magnetic field, spontaneous magnetization 5a of the sensor film 5 aligns along a direction denoted by an initial state 13, which may be achieved by applying a bias magnetic field 20 to the sensor film. In this configuration, an angle $\alpha$ 5c between the magnetization 5a and current 8 is 90°, which does not produce any planar Hall voltage $V_{PHE}$, as expected from Equation 1. However, in the presence of an external magnetic field 6, for example an upward magnetic field, magnetization 5a in the sensor film 5 rotates toward the direction of the current 8, resulting in a decrease of angle $\alpha$ and producing a planar Hall voltage, $V_{PHE}$. As can be understood from Equation 1, $V_{PHE}$ has a maximum value at $\alpha=45°$. For a full rotation of magnetization 5a from 0° (upward direction) to 180° (downward direction), the change of $V_{PHE}$ is shown in FIG. 2B. The angle $\alpha$ between the direction of current 8 and the magnetization 5a is equal to 45°+θ, where θ is the deviation of magnetization 5a from 45°, denoted by 14a. For θ=0°, planar Hall voltage has a maximum positive value of "+$(V_{PHE})_{max}$," and for θ=90°, planar Hall voltage has a maximum negative value of "−$(V_{PHE})_{max}$." Referring again to FIGS. 2A-2B, by adjusting an intensity of the bias magnetic field 20, it is possible to keep the rotation of sensor magnetization 5a in the range of 45°<$\alpha$<135° (or 0°<θ<90°), and under these conditions, it is possible to use the linear part of the $V_{PHE}$ vs. $\alpha$ curve for application as a read-sensor in a magnetic head.

In one embodiment, a magnetization of the sensor thin film preferentially orients about parallel to the down-track direction under application of a bias magnetic field oriented about parallel to the down-track direction, wherein the magnetization of the sensor thin film rotates relative to the down-track direction in response to an external magnetic field oriented in a sensor thin film height direction (e.g., emanating from recorded bits on a perpendicular magnetic recording medium).

Figure 3:
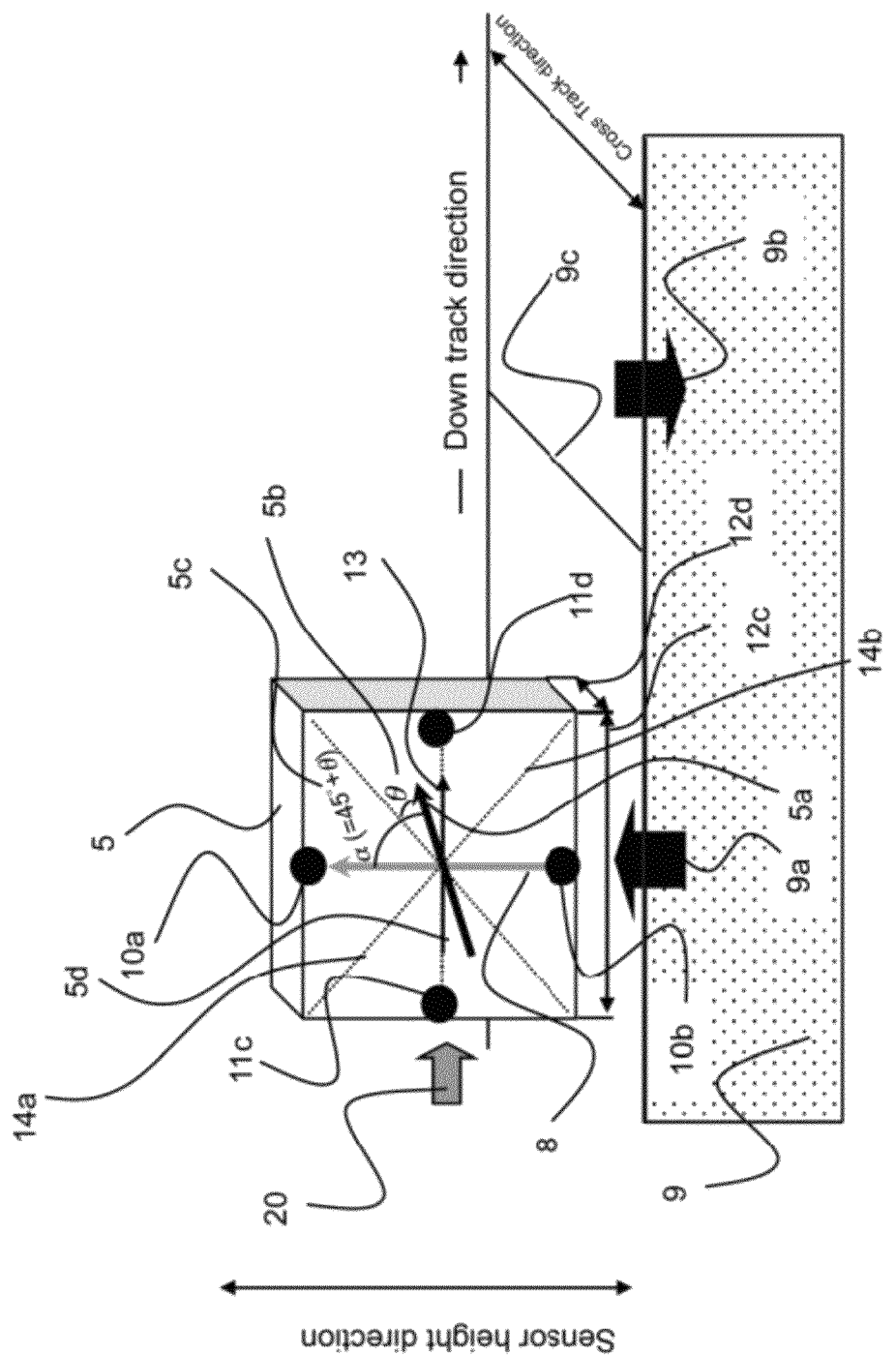
FIG. 3 is a schematic diagram of the operation of a device that uses the planar Hall effect, according to one embodiment.

FIG. 3 illustrates one concept of a read-sensor device, according to one embodiment. The device includes a sensor film 5 that has magnetic anisotropy along a film plane. A thickness 12c of the sensor film along the down-track direction is wider than a thickness 12d along the cross-track direction. Furthermore, a bias magnetic field 20 that is applied to the sensor film 5 during operation of the device along the down-track direction defines an initial state of the sensor magnetization 5a. In absence of an external magnetic field, sensor magnetization 5a lies along the down-track direction denoted by 13 under application of the bias magnetic field 20. By keeping the down-track sensor thickness 12c wider than the cross-track sensor thickness 12d, it is possible to have the sensor magnetization 5a rotate preferentially along a plane defined by the down-track direction and sensor height direction. A DC current 8 is passed through the current electrodes 10a and 10b during operation of the device. In the absence of an external magnetic field, the angle α between the sensor magnetization 5a and current 8 is 90° resulting in no planar Hall voltage, $V_{PHE}$, being detected through the voltage electrode 11c and 11d as can be understood from Equation 1. For an upward magnetic field 9a emanating from a bit written along the upward direction on the magnetic disk medium 9, sensor magnetization 5a rotates toward the direction of the current 8. This rotation occurs only when the magnetic field $H_m$ (denoted by 9a) emanating from the magnetic medium becomes larger than the bias magnetic field $H_b$ (denoted by 20). The larger the upward $H_m$, the smaller the angle α (which means the smaller the angle θ) and the larger the positive planar Hall voltage "+($V_{PHE}$)." As the read head moves along the down-track direction, it confronts with the downward bit region separated by a transition 9c from the previous upward bit region. For a downward magnetic field 9b emanating from a downward bit written on the magnetic disc medium 9, sensor magnetization 5a rotates toward the downward direction, e.g., away from the current direction. In this case, rotation also occurs when the downward magnetic field $H_m$ from the magnetic medium becomes larger than the bias magnetic field $H_b$. The larger the downward magnetic field $H_m$, the larger the angle α (which means a larger angle θ), and the larger the negative planar Hall voltage "−($V_{PHE}$)." By adjusting the bias magnetic field $H_b$ (denoted by 20), it is possible to keep the operating (rotation) range of sensor magnetization 5a in the range of 45°<θ<135°, e.g., between the 45° direction 14a and 135° direction 14b.

Figure 4:
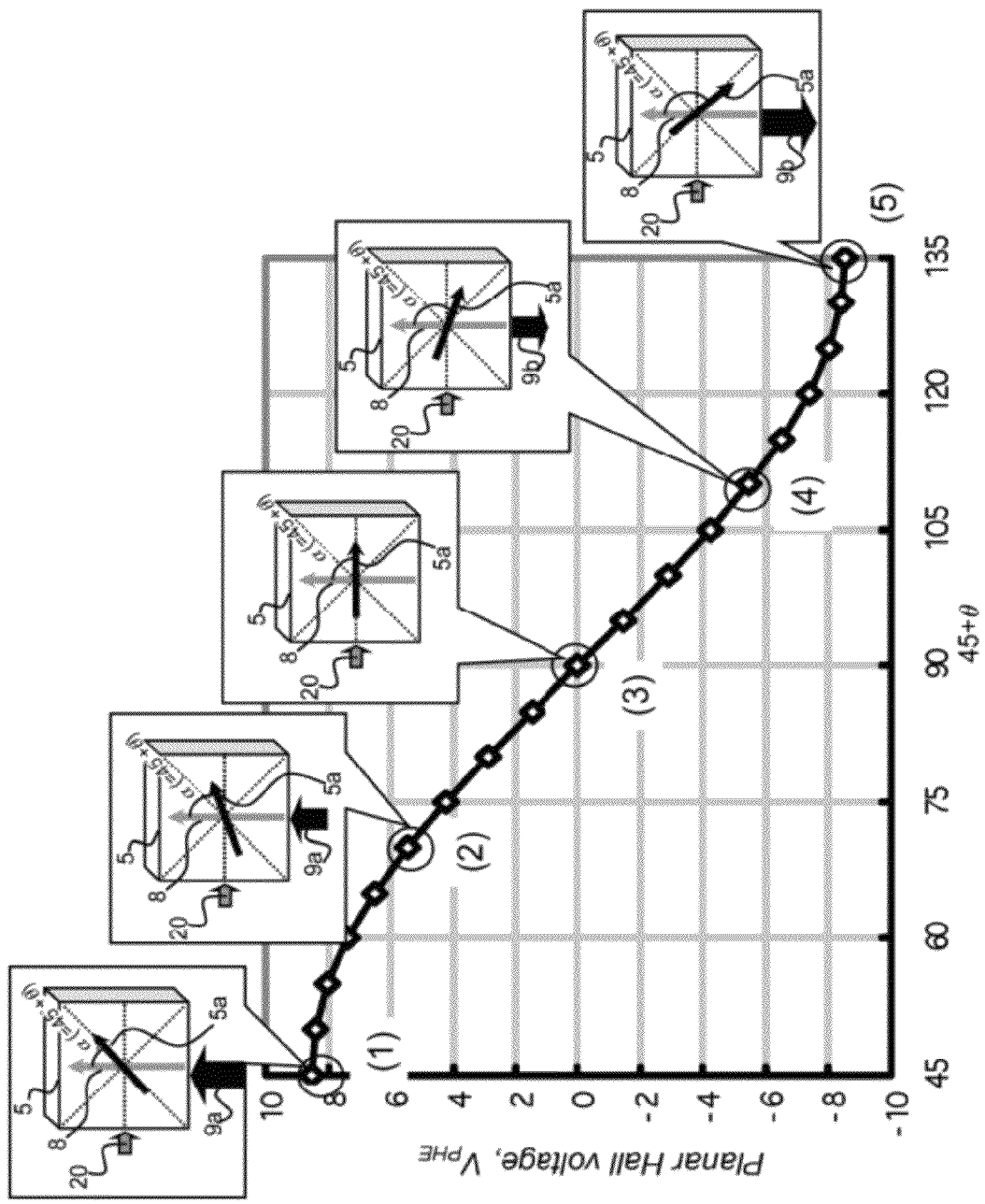
FIG. 4 is a plot showing a relationship of planar Hall voltage and change of an angle between the current passed through the sensor and the sensor magnetization, due to the application of an external magnetic field emanating from a magnetic medium, according to one embodiment.

For an operation rotation range of 45°<α<135° (or 0°<θ<90°), changes in a direction of the sensor magnetization 5a and the corresponding changes in the planar Hall voltage, $V_{PHE}$, are shown in FIG. 4. When the upward external magnetic field 9a from the medium is sufficiently large enough to rotate the sensor magnetization 5a and align along the 45° direction, 14a, as shown in FIG. 3, the maximum positive planar Hall voltage "+($V_{PHE}$)$_{max}$" is detected. With the decrease of upward external magnetic field 9a, sensor magnetization 5a rotates back toward the direction of its initial state as indicated by element 13 in FIG. 3. However, if the upward external magnetic field is still larger than the bias magnetic field, the angle α is still smaller than 90°, and for such a magnetization configuration, a certain amount of positive planar Hall voltage "+($V_{PHE}$)" is detected.

When there is no upward or downward external magnetic field from the magnetic medium (such as for the case when the sensor is positioned on the transition 9c between the two neighboring bits) sensor magnetization 5a rotates back to its initial state, as shown in 13 in FIG. 3, and for such a magnetization configuration, the angle α is 90° and the planar Hall voltage is zero. When a downward external magnetic field 9b is applied, and the magnetic field $H_m$ is larger than the bias magnetic field $H_b$, sensor magnetization 5a rotates downward that is away from the current direction, which makes the angle α larger than 90°. For such a magnetization configuration, a negative planar Hall voltage "($V_{PHE}$)" is detected. When the external downward magnetic field 9b is sufficiently larger than the bias magnetic field, sensor magnetization 5a gets aligned along the 135° direction, as shown by 14b in FIG. 3, and the maximum negative planar Hall voltage "−($V_{PHE}$)$_{max}$" is detected.

The descriptions herein of the angle α, cross-track direction, down-track direction, etc., may indicate either direction along these described directions, e.g., the reverse direction also. For example, the planar Hall voltage $V_{PHE}$ may exist in the down-track direction, or, especially in cases where the bias magnetic field is in a reverse direction, the planar Hall voltage $V_{PHE}$ may exist in a direction opposite the down-track direction.

In order to achieve a linear voltage response from the sensor, it is advantageous to operate the sensor in the rotation range of 45°<α<135° (or 0°<θ<90°). At the center of a recorded bit (with upward or downward magnetization), the magnetic field from the medium has a maximum value of |($H_m$)$_{max}$|. The magnitude of the bias magnetic field $H_b$ (denoted by 20) may preferably be large enough so that the rotation range of sensor magnetization lies in the range 45°<α<135° (or 0°<θ<90°). The relationship +($H_m$)$_{max}$>$H_b$ may preferably be maintained to achieve the maximum rotation angle 45°<α under the application of an external magnetic field along the upward direction. On the other hand, maintaining the relationship −($H_m$)$_{max}$>$H_b$ allows for achieving the maximum rotation angle 135°>α under the application of an external magnetic field along the downward direction.

Figure 5A:
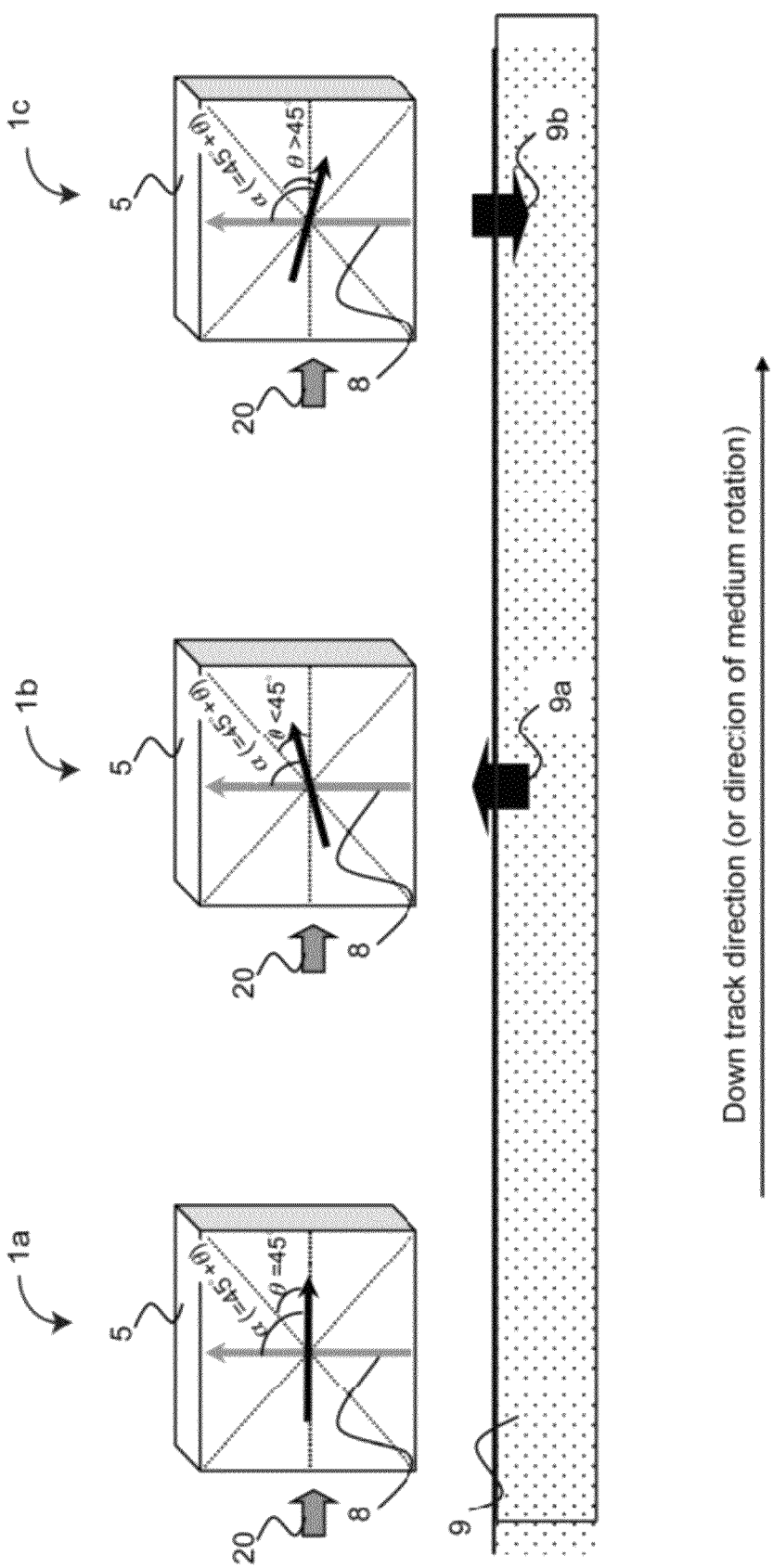
FIG. 5A shows the timing sequence of the output planar Hall voltage of a sensor device during the detection of recorded bits, according to one embodiment.
Figure 5B:
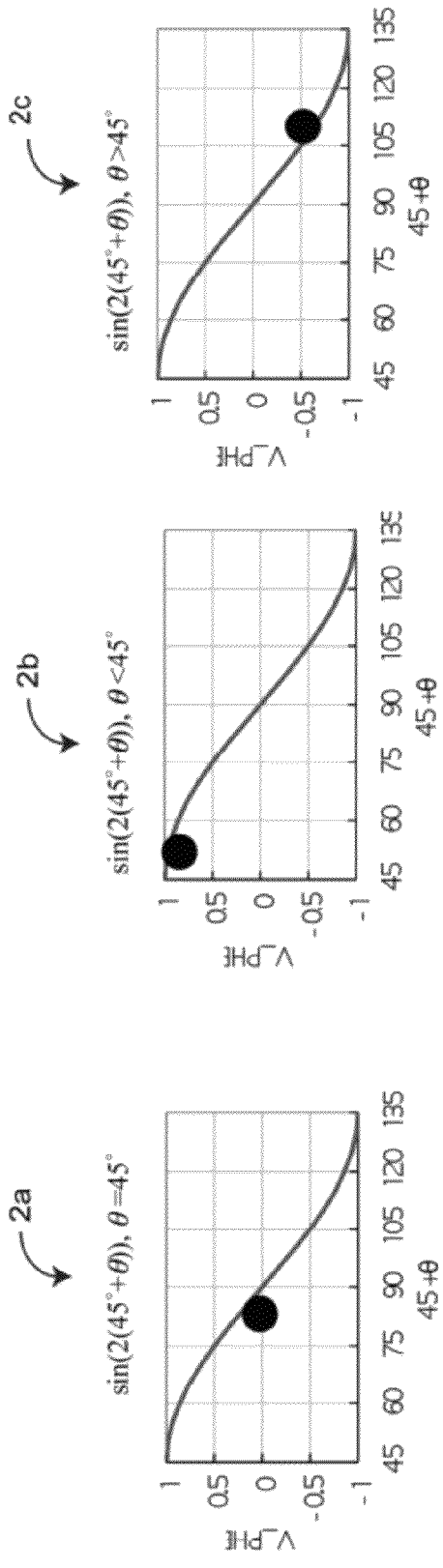
FIG. 5B shows the timing sequence of the output planar Hall voltage of a sensor device during the detection of recorded bits, according to one embodiment.
Figure 5C:
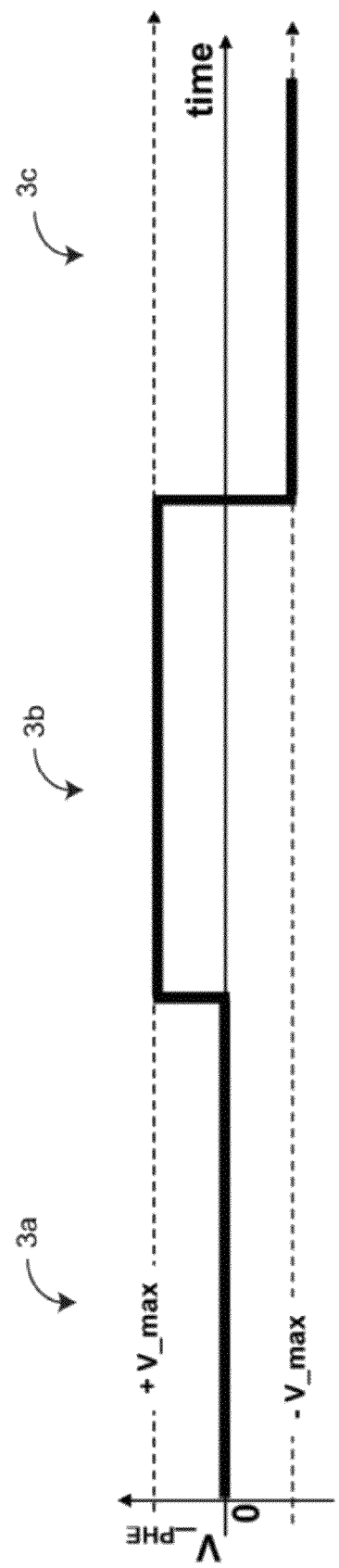
FIG. 5C shows the timing sequence of the output planar Hall voltage of a sensor device during the detection of recorded bits, according to one embodiment.

FIGS. 5A-5C illustrate a sequence of reproducing data written on a medium 9 using a read-head that implements a sensor according to one embodiment. Elements 1a, 1b, and 1c of FIG. 5A show the rotation of the sensor magnetization 5a while the read-head passes along the down-track direction on the magnetic disk medium 9. Elements 2a, 2b, and 2c of FIG. 5B indicate the planar Hall voltage with respect to the angle 45°+θ (α). Elements 3a, 3b, and 3c of FIG. 5C correspond to the planar Hall voltage value in terms of time as the read-head moves along the down-track direction. While there is no external magnetic field, as shown in 1a, sensor magnetization 5a lies along the down-track direction due to the application of a bias magnetic field 20 and this state corresponds to the angle 45°+θ=90°, as shown in 1b, which does not produce any planar Hall voltage as shown in 1c. Under application of an upward external magnetic field 9a, as shown in 2a from the upward magnetization in the magnetic medium 9, sensor magnetization 5a rotates toward the current direction resulting in the angle 45°+θ<90° as shown in 2b, which produces a positive planar Hall voltage shown in 2c. Similarly, under the application of a downward external magnetic field 9b due to the downward magnetization in the magnetic medium 9, sensor magnetization 5a rotates away from the current direction, as shown in 3a, resulting in the angle 45°+θ>90°, as shown in 3b, which produces a certain amount of negative planar Hall voltage shown in 3c. The magnitude of planar Hall voltage shown in 2c and 3c, respectively, depends on the extent of rotation of the sensor magnetization (that is how large or small the angle α, (or 45°+θ)), which depends on how large or small the magnetic field from the medium is as applied to the sensor.

Other than the angle α, planar Hall voltage generated in the sensor depends on a thickness of the sensor, spontaneous magnetization of the sensor, and the planar Hall coefficient as can be understood from Equation 1. Planar Hall voltage is inversely proportional to the sensor thickness 12d (as shown in FIG. 3) along the cross-track direction, which means that the thinner the sensor thickness 12d, the higher the planar Hall voltage.

Figure 6:
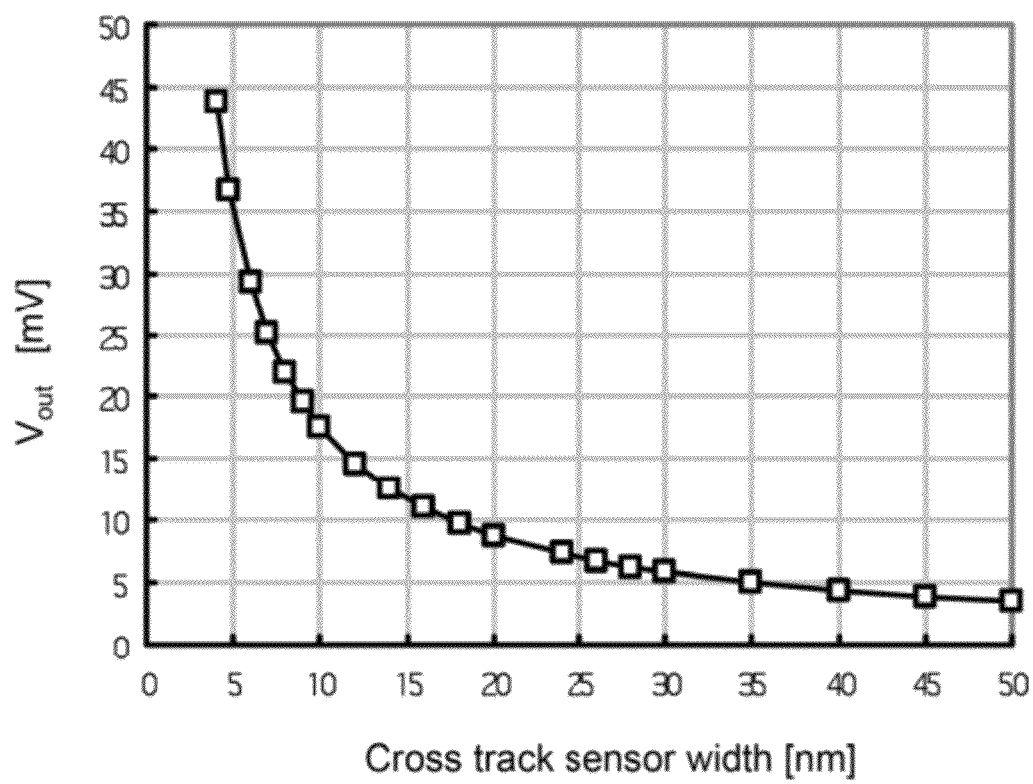
FIG. 6 is a plot showing a relationship of planar Hall voltage and cross-track sensor thickness, according to one embodiment.

FIG. 6 shows the change of output planar Hall voltage $V_{out}$ with respect to sensor thickness along the down-track direction, according to one embodiment. Here, $V_{out}$ shown in the vertical axis is the difference between the positive planar Hall voltage "$+V_{PHE}$" (corresponding to the rotation of sensor magnetization toward the current direction) and negative planar Hall voltage "$-V_{PHE}$" (corresponding to the rotation of sensor magnetization away from the current direction). High planar Hall voltage in the narrow sensor thickness region indicates an increase in sensor sensitivity, which is opposite to the trend (that is the decrease of output reproduction voltage due to the decrease of sensor thickness) generally observed for conventional GMR and TMR sensors.

Figure 7:
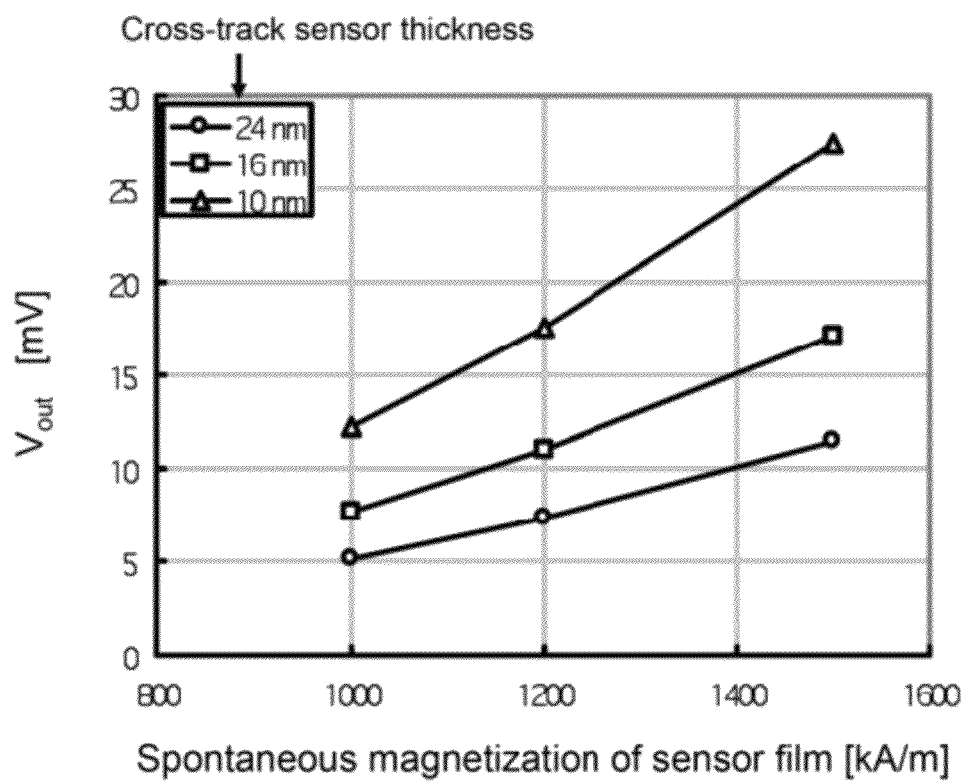
FIG. 7 is a plot showing a relationship of planar Hall voltage with change of spontaneous magnetization of the sensor film for various cross-track sensor thicknesses, according to one embodiment.

FIG. 7 shows how $V_{out}$ changes with the spontaneous magnetization of the sensor for three different sensor thicknesses along the cross-track direction, according to one embodiment. $V_{out}$ increases with an increase of sensor spontaneous magnetization and this increase is enhanced further when combined with a thinner cross-track sensor thickness.

Figure 8:
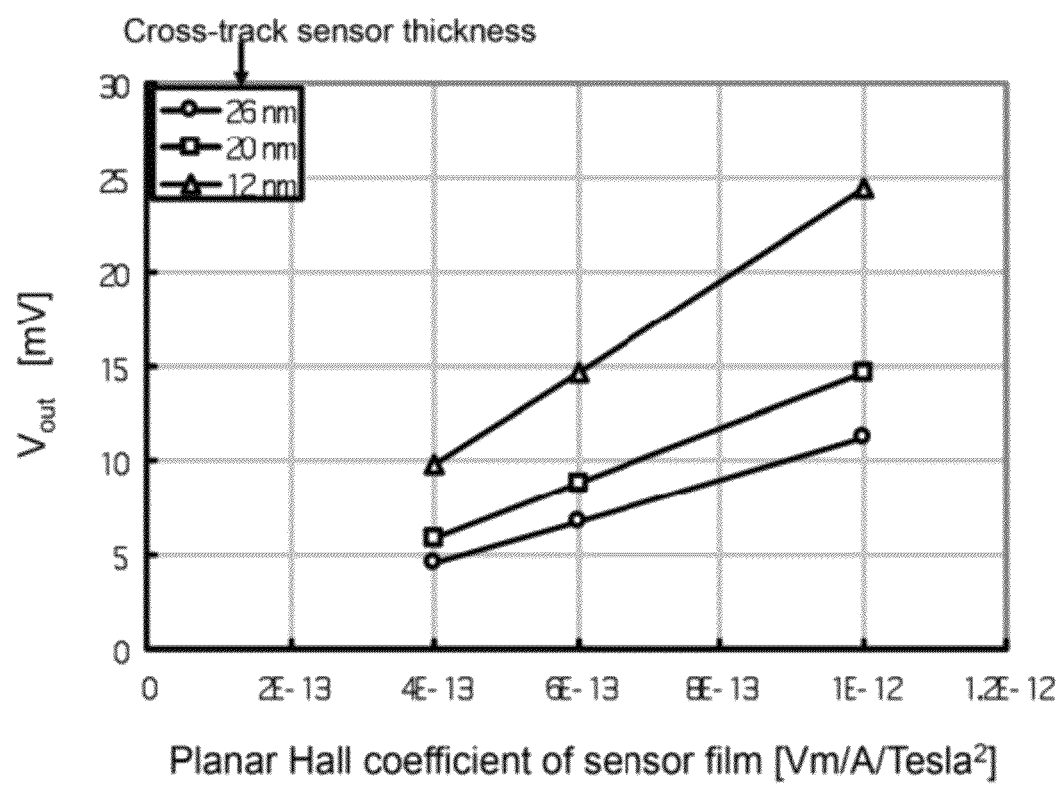
FIG. 8 is a plot showing a relationship of planar Hall voltage and the planar Hall coefficient of a sensor film for various cross-track sensor thicknesses, according to one embodiment.

The planar Hall coefficient $R_{PHE}$ is another factor which influences the sensitivity of the sensor. FIG. 8 shows the change of $V_{out}$ with respect to the planar Hall coefficient, $R_{PHE}$, for various cross-track sensor thicknesses. $V_{out}$ increases with increasing $R_{PHE}$. When combined with thinner cross-track sensor thickness, large $R_{PHE}$ enhances $V_{out}$ further. As can be understood from Equation 1, large current passed through the sensor can generate large $V_{out}$. However, large current generates heat and increases sensor temperature, which is not favorable for stable sensor operation. Thus, it becomes advantageous to operate the sensor at low current without sacrificing the magnitude of $V_{out}$. As shown in FIG. 8, sensor films with large $R_{PHE}$ generate large planar Hall voltages even at low operating currents.

Figure 9:
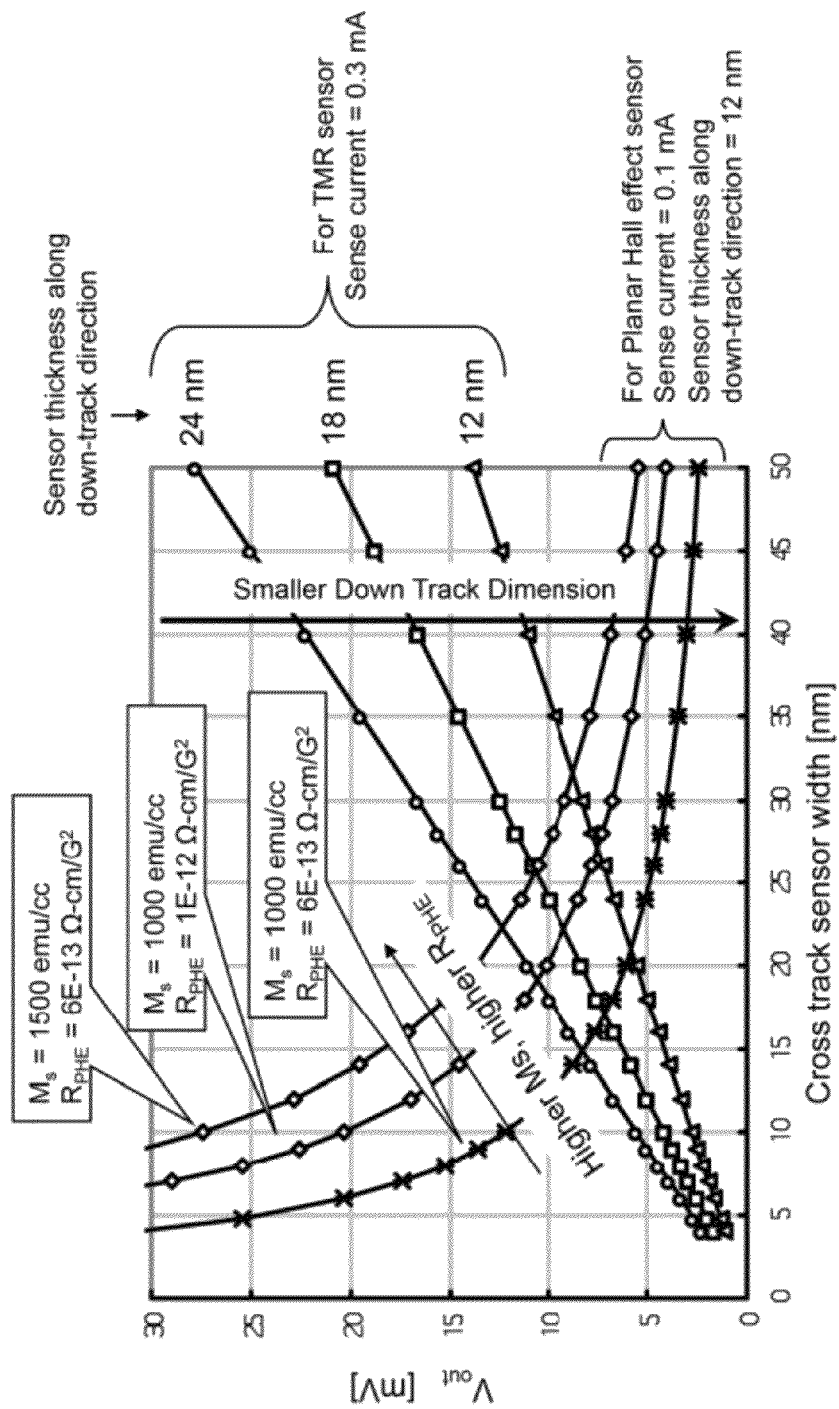
FIG. 9 is a plot comparing the output read-head voltage from a device that uses the planar Hall effect and a device that uses conventional TMR heads according to changes in cross-track sensor thicknesses and down-track sensor thicknesses, according to one embodiment.

FIG. 9 compares the performance of conventional TMR heads and heads that use the planar Hall effect sensor with respect to variations in cross-track sensor width. The data compiled in FIG. 9 was gathered using a TMR sensor with a sense current of 0.3 mA and a down-track thickness of 12 nm, 18 nm, and 24 nm, and a planar Hall effect sensor with a sense current of 0.1 mA and a fixed down-track thickness of 12 nm. The horizontal axis of FIG. 9 denotes the cross-track sensor thickness of the read head. Furthermore, as depicted in FIG. 9, $M_s$ is the sensor saturation magnetization, and $R_{PHE}$ is the planar Hall coefficient. In conventional TMR heads, output voltage decreases with cross-track sensor width. Output voltage of conventional TMR heads decreases further with down-track sensor thickness. Decrease of output voltage becomes more significant while the down-track sensor width is reduced. On the other hand, for the read heads using the planar Hall effect sensor described herein, output voltage increases inversely with decreasing cross-track sensor thickness. Moreover, the output planar Hall voltage is enhanced when combined with higher spontaneous magnetization, $M_s$, of the sensor and larger planar Hall coefficient, $R_{PHE}$. For high track-density recording over 1000 kTpi (tracks per inch), it is advantageous to make a track as narrow as about 20 nm.

For high track-density cases, decreasing track-pitch increases the possibility of side reading, even when the read-head is positioned at the center of the track, if the width of the read head is not sufficiently narrow. However, during read processing generally, there exists a fluctuation in positioning, which very frequently moves the head away from the track center. In this case, a narrow read-head is helpful to reduce erroneous side track or track-edge reading to maintain a high signal-to-noise ratio (SNR). In order to reproduce data from a track as narrow as about 20 nm, it is advantageous to make the read-head width narrower than about 15 nm. In such a narrow read-width region, the output voltage of a conventional TMR heads drops drastically. However, the output voltage of the read head sensor using the planar Hall effect increases significantly in the region even below 15 nm, opposite to the trend observed for conventional TMR heads.

Figure 10A:
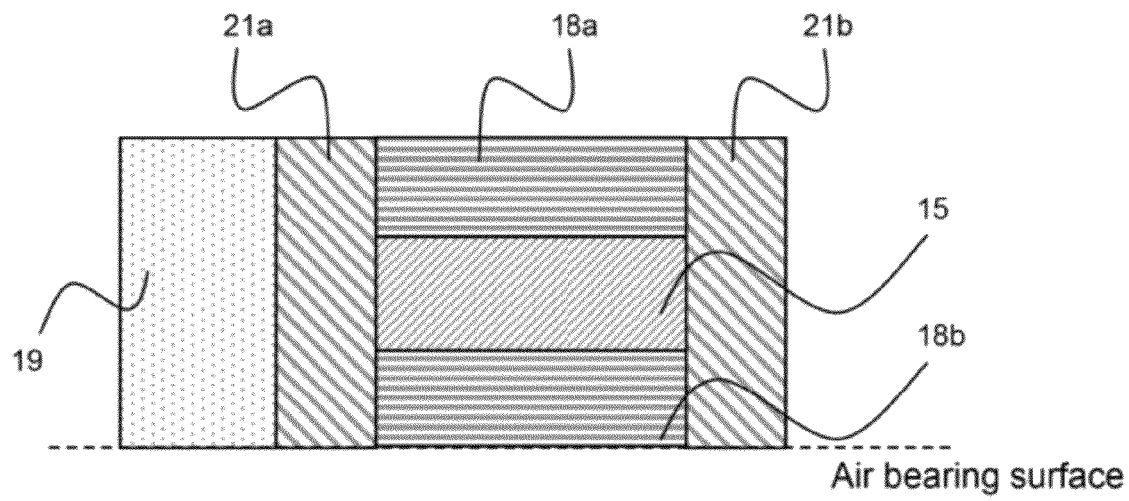
FIG. 10A is a side view of a portion of a magnetic head, according to one embodiment.
Figure 10B:
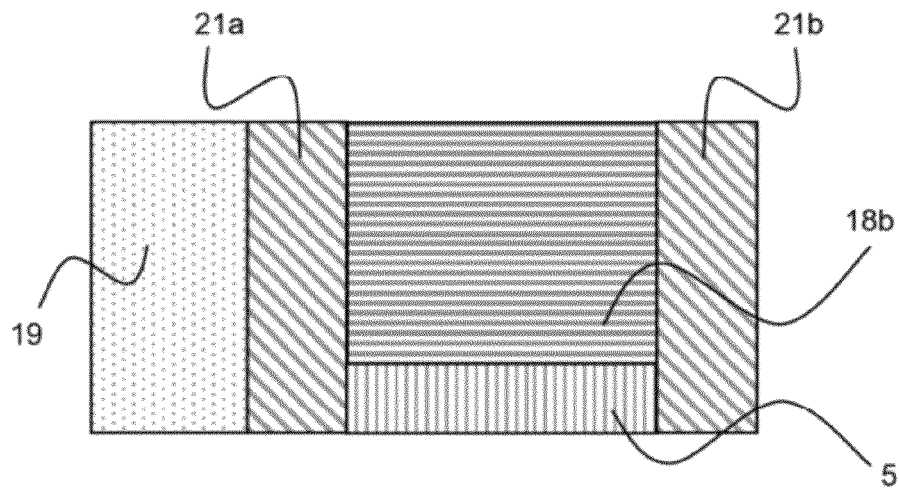
FIG. 10B is an air bearing surface view of a portion of a magnetic head, according to one embodiment.
Figure 10C:
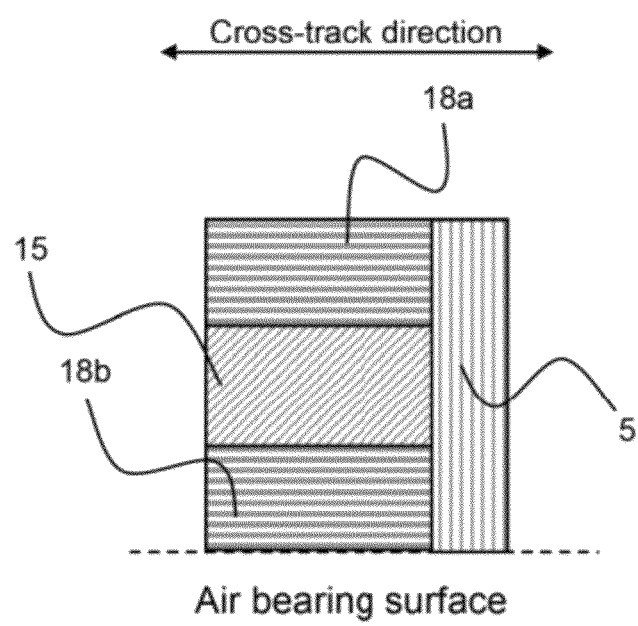
FIG. 10C is a right-side view of a portion of a magnetic head, absent a hard bias magnetic film, according to one embodiment.

A layout of the electrodes for flowing current through a sensor film and detecting the planar Hall voltage from the sensor is shown in FIGS. 10A-10C. FIG. 10A shows a front view of a portion of a magnetic head, and FIG. 10B shows a view from the air bearing surface. FIG. 10C shows a side view of the head shown in FIG. 10A when a hard bias film 21b does not exist. On a slider substrate 19, which is not generally electroconductive, a hard bias magnetic film 21a may be deposited, as shown. A sensor film 5 may be deposited on the hard bias magnetic film 21a and then milled along the cross-track direction to the thickness as shown in FIG. 10C. The sensor film 5 may comprise a NiFe alloy, in one embodiment. A non-magnetic metal film 18a may be deposited and milled to the shape as shown in FIG. 10C. An insulator (electrically non-conductive) thin film 15 may then be deposited and trimmed to the shape shown in FIG. 10C. After the deposition of insulator thin film 15, a non-magnetic metal film 18b may be deposited and milled to the shape shown in FIG. 10C. Finally, on the surface shown in FIG. 10C, a hard bias magnetic film 21b may be deposited.

Figure 11:
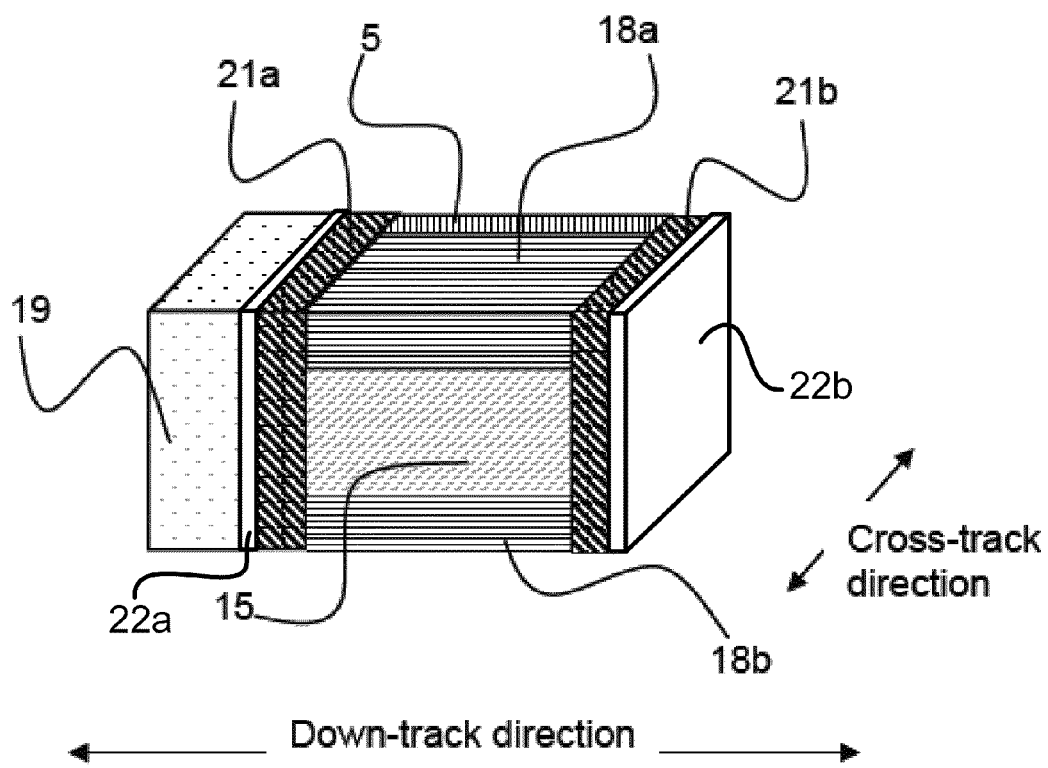
FIG. 11 shows a sensor device after deposition on the substrate and milling processes, according to one embodiment.

The final shape (after deposition and milling) of the read-head device is shown in FIG. 11, according to one embodiment. Thin films with perpendicular magnetic anisotropy, such as Co—Cr based alloy materials, may be used as hard bias magnetic films 21a and 21b. These two hard bias magnetic films also serve as the electrodes for the detection of planar Hall voltage in the sensor film 5. Non-magnetic metal films 18a and 18b are used as the electrodes for passing current through the sensor film 5. Moreover, the insulator (non-electroconductive material) film 15 between the current electrodes 18a and 18b prohibits the direct flow of current between them and enables current to pass through the sensor film 5. Non-magnetic metal films such as Cu, Au, Pt, Ta, etc., may be used for the current electrodes 18a and 18b. An oxide film, such as one comprising $Al_2O_3$, may be used as the insulator thin film 15. According to one embodiment, a $Ni_xFe_{100-x}$ alloy thin film, where x is atomic percent, may be used as the sensor film. The content of Ni may be adjusted to achieve a high planar Hall co-efficient, $R_{PHE}$, and optimum or near optimum saturation magnetization, $M_s$, so that a large planar Hall voltage is obtained. The hard bias magnetic film thickness may be around 3 nm, according to one embodiment. The sensor film thickness along the cross-track direction may be as narrow as 5 nm or less, according to one embodiment, while the thickness along the down-track direction may be thicker than that along the cross-track direction. In one embodiment, a down-track thickness double of that of a cross-track thickness may be a suitable choice. Preferential rotation of sensor magnetization 5a along the down-track direction is the key point in this invention, which may be realized by adjusting the hard bias magnetic field (by adjusting the hard bias magnetic film thickness, composition of the hard bias magnetic film) and ratio of the down-track thickness to cross-track thickness of the sensor film. For preferential rotation of the magnetization along the down-track direction ratio of the down-track thickness to cross-track thickness of the sensor film may be larger than "1".

In order to prevent the reading of an unexpected neighboring bit magnetic shield films 22a, 22b can be used on the left side of hard bias magnetic film 21a and the right side of the hard bias magnetic film 21b, respectively. As shown in FIG. 11 two 3 nm thick hard bias magnetic films on opposite sides of the sensor film 5 with down-track thickness of around 8 nm (with cross-track thickness of around 5 nm) makes the total down-track device thickness of around 14 nm. With the magnetic shield films 22a, 22b present, on the left side of 21a and right side of 21b, respectively, a shield-to-shield spacing of around 14 nm is possible to achieve.

Figure 12:
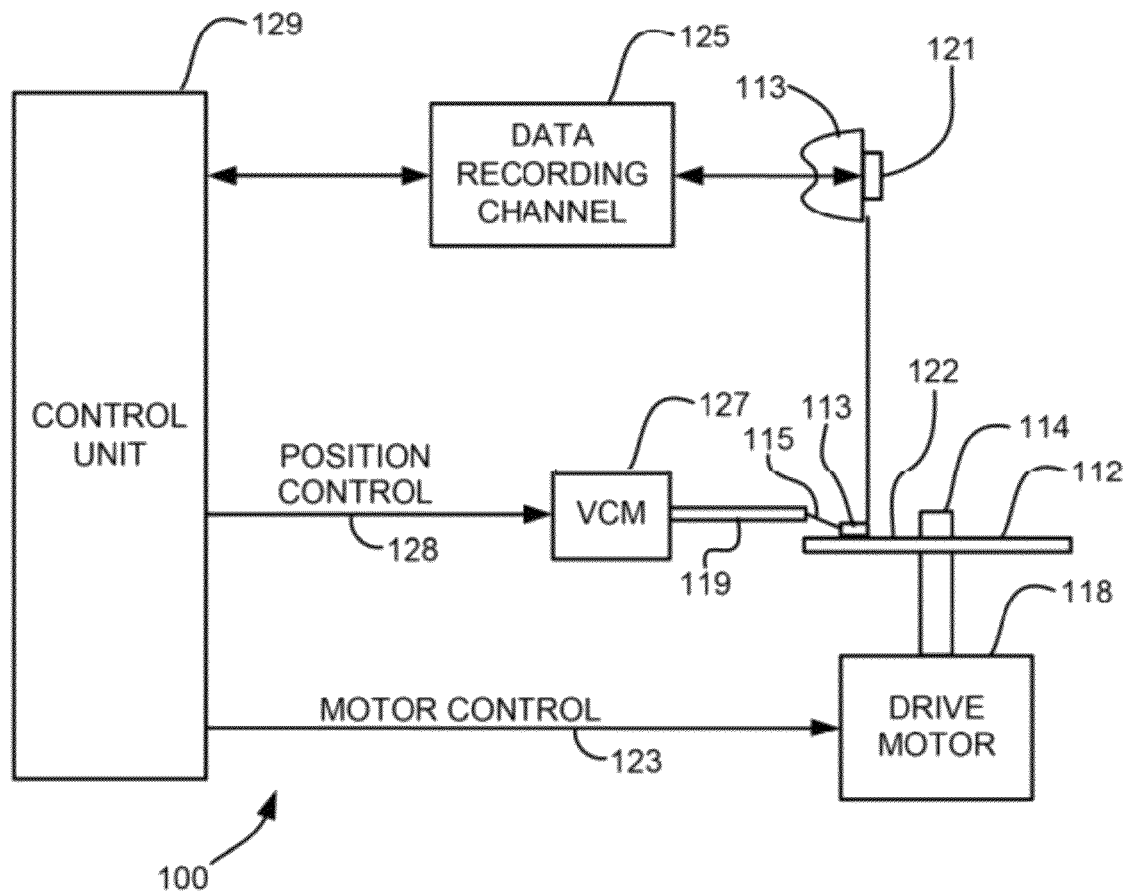
FIG. 12 is a simplified drawing of a magnetic recording disk drive system.

Referring now, to FIG. 12, there is shown a disk drive 100 in accordance with one embodiment of the present invention. As shown in FIG. 12, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 12 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 12 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

According to one embodiment, a magnetic data storage system includes at least one magnetic head as described herein, a magnetic medium, a drive mechanism for passing the magnetic medium over the at least one magnetic head, and a controller electrically coupled to the at least one magnetic head for controlling operation of the at least one magnetic head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a sensor thin film adapted for producing a planar Hall voltage, the sensor thin film having a thickness along a down-track direction that is greater than a thickness along a cross-track direction; and
   a magnetic medium,
   wherein the down-track direction is in a direction of travel of the magnetic medium relative to the sensor thin film, and
   wherein the cross-track direction is perpendicular to the down-track direction.

2. The system as recited in claim 1, further comprising two voltage electrodes coupled to the sensor thin film, the voltage electrodes allowing detection of a change of the planar Hall voltage across the sensor thin film due to a change of an angle between current passing through the sensor thin film and a magnetization of the sensor thin film during operation of the sensor thin film.

3. The system as recited in claim 2, wherein the planar Hall voltage detected by the voltage electrodes corresponds to a magnetization of recorded bits on the magnetic medium.

4. The system as recited in claim 2, wherein the angle between current passed through the sensor thin film and the magnetization of the sensor thin film ranges between about 45° to about 135° during operation of the sensor thin film.

5. The system as recited in claim 2, wherein the two voltage electrodes coupled to the sensor thin film comprise two hard bias magnetic films positioned on a leading side and a trailing side of the sensor thin film, thereby being aligned with the sensor thin film in the down-track direction.

6. The system as recited in claim 5, wherein the hard bias magnetic films possess perpendicular magnetic anisotropy along a plane defined by the down-track direction and a sensor thin film height direction.

7. The system as recited in claim 2, further comprising a thin film insulator positioned between the two voltage electrodes, the thin film insulator adapted for preventing direct current flow between the voltage electrodes.

8. The system as recited in claim 2, further comprising two magnetic shield thin films on opposite sides of the sensor thin film along the down-track direction, the magnetic shield thin films adapted for preventing reading of data from neighboring bits on the magnetic medium.

9. The system as recited in claim 1, wherein the sensor thin film possesses magnetic anisotropy along a plane defined by the down-track direction and a sensor thin film height direction.

10. The system as recited in claim 1, wherein the sensor thin film comprises a NiFe alloy.

11. The system as recited in claim 6, wherein the hard bias magnetic films each have a thickness along the down-track direction that is at least twice that of the thickness along the cross-track direction.

12. The system as recited in claim 1, wherein the sensor thin film thickness along the down-track direction is at least twice the thickness thereof along the cross-track direction.

13. The system as recited in claim 1, wherein a magnetization of the sensor thin film preferentially orients about parallel to the down-track direction under application of a bias magnetic field oriented about parallel to the down-track direction, wherein the magnetization of the sensor thin film rotates relative to the down-track direction in response to an external magnetic field oriented in a sensor thin film height direction.

14. The system as recited in claim 1, further comprising:
a drive mechanism for passing the magnetic medium over the sensor thin film; and
a controller electrically coupled to the sensor thin film.

15. A magnetic data storage system, comprising:
at least one magnetic head, comprising:
a sensor thin film adapted for producing a planar Hall voltage, the sensor thin film having a thickness along a down-track direction that is greater than a thickness along a cross-track direction;
two voltage electrodes coupled to the sensor thin film, the voltage electrodes allowing detection of a change of the planar Hall voltage across the sensor thin film due to a change of an angle between current passing through the sensor thin film and a magnetization of the sensor thin film during operation of the sensor thin film,
wherein the planar Hall voltage detected by the voltage electrodes corresponds to a magnetization of recorded bits on a magnetic medium,
wherein a magnetization of the sensor thin film preferentially orients about parallel to the down-track direction under application of a bias magnetic field oriented about parallel to the down-track direction, wherein the magnetization of the sensor thin film rotates relative to the down-track direction in response to an external magnetic field oriented in a sensor thin film height direction,
wherein the down-track direction is in a direction of travel of the magnetic medium relative to the sensor thin film, and
wherein the cross-track direction is perpendicular to the down-track direction,
the magnetic medium;
a drive mechanism for passing the magnetic medium over the at least one magnetic head; and
a controller electrically coupled to the at least one magnetic head for controlling operation of the at least one magnetic head.

16. The magnetic data storage system as recited in claim 15, wherein the sensor thin film thickness along the down-track direction is at least twice that of the thickness thereof along the cross-track direction.

17. The magnetic data storage system as recited in claim 15, wherein the two voltage electrodes coupled to the sensor thin film comprise two hard bias magnetic films positioned on a leading side and a trailing side of the sensor thin film, thereby being aligned with the sensor thin film in the down-track direction.

18. The magnetic data storage system as recited in claim 17, wherein the hard bias magnetic films possess perpendicular magnetic anisotropy along a plane defined by the down-track direction and a sensor thin film height direction.

19. The magnetic data storage system as recited in claim 15, further comprising a thin film insulator positioned between the two voltage electrodes, the thin film insulator adapted for preventing direct current flow between the voltage electrodes.

20. The magnetic data storage system as recited in claim 15, wherein the sensor thin film possesses magnetic anisotropy along a plane defined by the down-track direction and a sensor thin film height direction.

21. The magnetic data storage system as recited in claim 15, further comprising two magnetic shield thin films on opposite sides of the sensor thin film along the down-track direction, the magnetic shield thin films adapted for preventing reading of data from neighboring bits on the magnetic medium.

22. The magnetic data storage system as recited in claim 15, wherein the angle between current passed through the sensor thin film and the magnetization of the sensor thin film ranges between about 45° to about 135° during operation of the sensor thin film.

23. A magnetic head, comprising:
a sensor thin film adapted for producing a planar Hall voltage, the sensor thin film having a thickness along a down-track direction that is greater than a thickness along a cross-track direction;
two non-magnetic metal films positioned adjacent the sensor thin film that are separated from one another by an insulator film, the non-magnetic metal films acting as electrodes for passing current through the sensor thin film;
two magnetic shield thin films on opposite sides of the sensor thin film along the down-track direction, the magnetic shield thin films adapted for preventing reading of data from neighboring bits on a magnetic medium;
two voltage electrodes coupled to the sensor thin film, the two voltage electrodes coupled to the sensor thin film comprising two hard bias magnetic films positioned on a leading side and a trailing side of the sensor thin film in the down-track direction; and
a thin film insulator positioned between the two voltage electrodes, the thin film insulator adapted for preventing direct current flow between the voltage electrodes,
wherein the voltage electrodes allow detection of a change of the planar Hall voltage across the sensor thin film due to a change of an angle between current passing through the sensor thin film and a magnetization of the sensor thin film during operation of the sensor thin film,
wherein the hard bias magnetic films possess perpendicular magnetic anisotropy along a plane defined by the down-track direction and a sensor thin film height direction,
wherein the planar Hall voltage detected by the voltage electrodes corresponds to a magnetization of recorded bits on the magnetic medium,
wherein the angle between current passed through the sensor thin film and the magnetization of the sensor thin film ranges between about 45° to about 135° during operation of the sensor thin film,
wherein the down-track direction is in a direction of travel of the magnetic medium relative to the sensor thin film, and
wherein the cross-track direction is perpendicular to the down-track direction.

* * * * *

UNITED STATES PATENT AND TRADEMARK OFFICE
CERTIFICATE OF CORRECTION

| | | |
|---|---|---|
| PATENT NO. | : 8,760,801 B2 | Page 1 of 1 |
| APPLICATION NO. | : 12/976975 | |
| DATED | : June 24, 2014 | |
| INVENTOR(S) | : Das et al. | |

It is certified that error appears in the above-identified patent and that said Letters Patent is hereby corrected as shown below:

In the specification:

col. 1, line 61 replace "distorted this" with --distorted and this--.

Signed and Sealed this
Ninth Day of September, 2014

Michelle K. Lee
*Deputy Director of the United States Patent and Trademark Office*